Oct. 29, 1935.  W. E. HOKE  2,019,049
FASTENING MEANS
Filed April 8, 1932
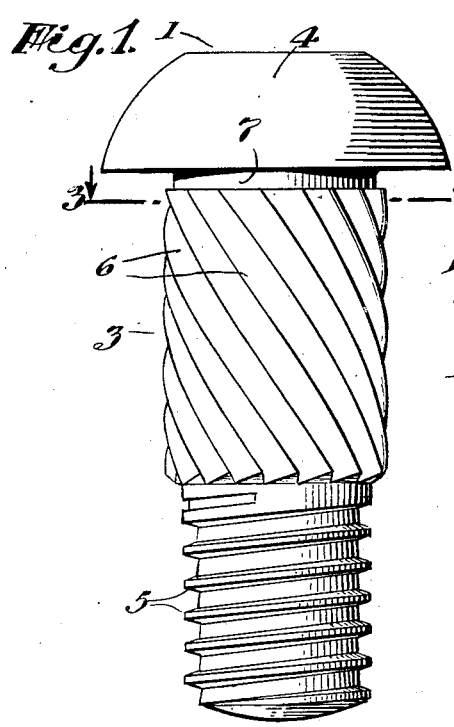
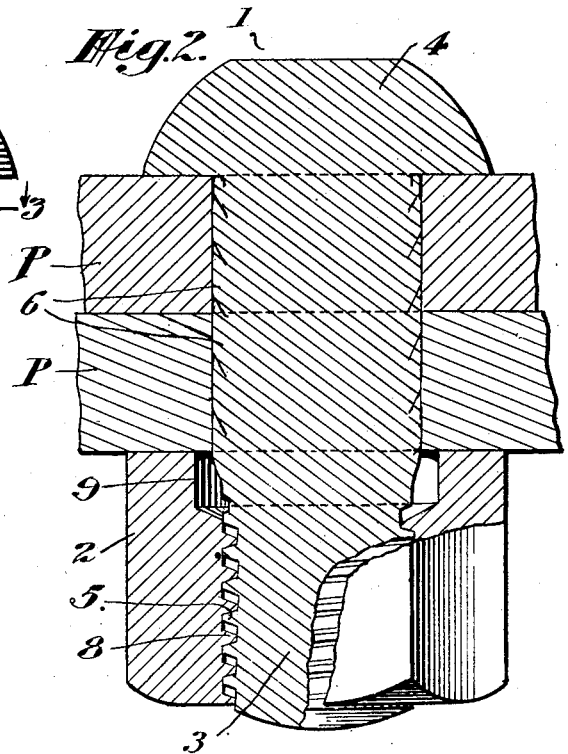
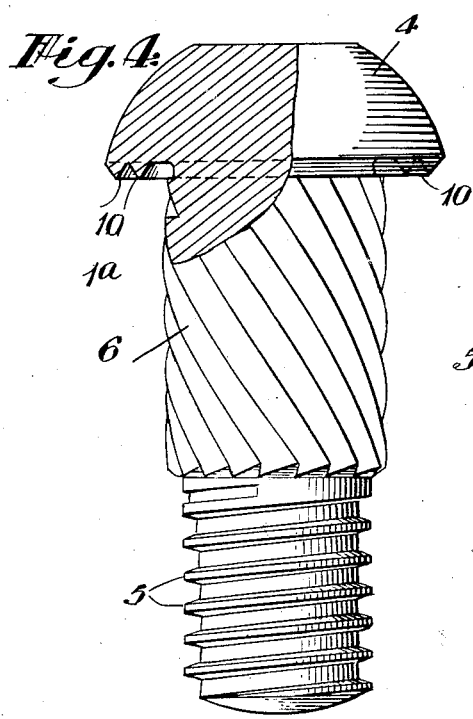
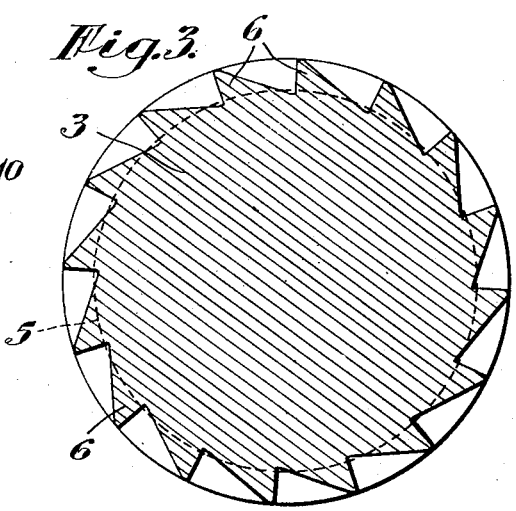
Inventor
WILLIAM E. HOKE
Davis and Davis
Attorneys Patented Oct. 29, 1935

2,019,049

UNITED STATES PATENT OFFICE 2,019,049

FASTENING MEANS

William E. Hoke, Baltimore, Md., assignor to Dardelet Threadlock Corporation, New York, N. Y., a corporation of Delaware Application April 8, 1932, Serial No. 603,961

3 Claims. (Cl. 85—1)

Important objects of the present invention are, to provide an improved fastening device having the desirable characteristics of both a bolt and a rivet, and to provide an improved tight-holding releasable fastening means designed for satisfactorily joining structural steel parts and the like.

Other objects of the invention will appear hereinafter.

In the drawing, Fig. 1 is a side view of the bolt member of the fastening device;

Fig. 2 a sectional view of a joint structure embodying the fastening device;

Fig. 3 a section on the line 3—3 of Fig. 1; and

Fig. 4 a sectional side view showing a modification of the bolt element.

The fastening means includes a bolt 1 and a nut 2. The bolt comprises a shank 3 having a rounded head 4 at one end and a thread 5 at its opposite end. Between the head and the thread the shank is serrated to form helically arranged projections in the form of ribs 6 extending around and along the shank, preferably from a point spaced slightly from the head to a point at or adjacent the thread 5. Between the head and the adjacent ends of the ribs the shank has a neck 7 of less diameter than the ribbed portion of the shank. Said ribs are arranged in a continuous series around the shank and each rib describes a portion of a steep helix coiled in a reverse direction to the coil of the thread 5. In cross section the ribs are preferably of approximately ratchet tooth form. The face of each rib directed obliquely toward the head 4 is disposed at an abrupt angle to the axis and the circumference of the shank while the face directed obliquely toward the threaded end of the shank is disposed at a rather low angle to the axis and the circumference. The crests of the ribs project radially materially farther than the crest of the thread 5 for a purpose which will appear hereinafter. Preferably the ribs are formed on a blank bolt shank by a cold rolling process which, in forming the grooves between the ribs, transversely extrudes the metal of the blank to form the protruding crests of the ribs. For so forming the ribs the bolt blank will preferably have a cylindrical shank portion of greater diameter than the maximum diameter of the thread 5. The ribs may, however, be formed otherwise than by the rolling method.

The thread 5 of the bolt and the thread 8 of the nut are complementary threads of equal and constant pitch, and are the well-known Dardelet type of screw thread disclosed in United States Patent No. 1,657,244. The nut thread and the root of the bolt thread slope inward and make an angle of preferably six degrees with the thread axis, this being within the angle of friction of the metal or metals of the threads. The ribs of the threads are much narrower than the grooves to permit relative crosswise displacement of the threads in an axial direction for self-locking mutual engagement of said sloping crest and root locking surfaces. The threads also have opposed, coactive abutment surfaces making an abrupt angle with the axis to positively limit said crosswise displacement.

At its abutment face the nut has a recess in the form of a counterbore 9 having a diameter exceeding the maximum diameter of the threads and also slightly exceeding the maximum diameter of the ribbed portion of the bolt. The height of the nut substantially corresponds to the length of the threaded reduced portion of the bolt shank, and the depth of the counterbore exceeds the axial distance between the adjacent end of the ribbed portion of the bolt and the point where the bolt thread begins to run out and become imperfect. The purpose of the counterbore is to permit the nut to be screwed fully against an abutment without obstruction by the ribs and by the imperfect inner end portion of the thread.

Preferably the metal of the bolt is softer than the metal of the parts P to be joined. In applying the bolt the threaded end thereof is inserted as far as it will go through registering apertures in said parts of slightly greater diameter than said threaded end but of less diameter than the ribbed portion of the bolt. Then, by either impact or steady pressure upon the bolt head the shank is forcibly driven into place. As the ribbed portion of the shank is driven home the protruding crests of the ribs are folded over or upset transversely of the ribs and progressively along the shank to progressively fill the grooves between the ribs, as shown in Fig. 2. This folding over of the rib crests is facilitated by the cross sectional form of the ribs and by their helical arrangement. The bolt is so proportioned with relation to the height of the nut and the thickness of the parts to be joined that the ribbed portion of the shank has a length equal to or slightly exceeding the depth of both of the registering holes and, as the ribbed portion is of uniform cross section, it will fill both holes. The metal of the ribs is molded by compression into close binding contact with substantially the entire area of the walls of both holes. Beneath the head of the bolt the ends of the ribs are upset into the space surrounding the neck 7.

The nut 2 is screwed upon the bolt thread and forcibly tightened to draw the parts firmly together. When the axial advance of the nut is arrested and the nut is further turned without axial advance its thread is axially displaced crosswise outward of the bolt thread and the sloping crest surface of the nut thread is jammed into self-locking frictional engagement with the inclined root surface of the bolt thread. The bolt shank is bound in the holes and positively resists the torque of screwing on and locking the nut so that there is no necessity of holding the bolt head against turning. The helical coiling of the ribs in a reverse direction to the coil of the thread contributes to the torque resistance.

The bolt, the nut and the joined parts are bound together in a rigid, unified joint structure in a manner to offer powerful resistance to any relative movement between them in any direction. Throughout the entire depth of the registering apertures there is a transverse bolt-work pressure which positively resists transverse relative displacement between the joined work pieces and also resists transverse relative displacement between the work pieces and the bolt. There is also a nut-work pressure longitudinally of the bolt which holds the work pieces clamped together. The nut-work pressure is positively maintained by the nut-locking feature and by said positive holding of the work pieces and the bolt against any transverse movement relatively to the nut. Thereby all movement tending to unscrew the nut is eliminated and the nut is positively held against loosening due to vibration or work movement. All parts of the joint are rigidly bound together to vibrate in unison as though they were integrally formed.

The fastening device can be used in place of a hot driven rivet and it has many advantages thereover. It makes a stronger joint, reduces the labor of making the joint, avoids the objectionable noise of rivet driving and renders the joint releasable by unscrewing the nut and driving out the bolt. It is possible to obtain a much greater compression of the joined parts by tightening the nut 2 than is obtainable by a rivet which produces compression solely by its cooling and contraction. Also, the longitudinal contraction of the rivet weakens it and the transverse contraction reduces its diameter and leaves a slight space in the holes. The cold driven bolt constantly fills the holes and owing to this fact together with the greatly increased compression obtainable by the nut, the joined parts are powerfully clamped together to resist slippage and reduce the shearing strain upon the fastening means.

In structural steel riveting it is customary to first produce the required compression of the joined parts by bolting them together through the rivet holes. Then, the bolts are removed one by one and replaced by hot driven rivets. My improved fastening means eliminates the necessity of this preliminary bolting together of the parts. The improved cold-driven bolt may be inserted at the start by a single, unassisted workman and by the employment of only a hand hammer and a wrench. Much labor is thereby eliminated.

Another advantage of the bolt is its accommodation to "drift" of the holes, that is, a slight lateral displacement of the holes out of accurate register. If the reduced, threaded end of the bolt is insertable through the holes the ribbed portion of the bolt may be driven into place, the rib crests upsetting to a greater or less degree in accordance with the drift. This avoids the necessity of bringing the holes into register by means of a drift pin or by reaming them to receive an oversize fastening element.

Fig. 4 shows a bolt element 1ª having annular integral abutment ribs 10 at the inner face of its head. These ribs are approximately V-shaped in cross section and their peaks are adapted to effect a biting engagement with an abutting joined part, penetrate any scale or other irregularities which may be on the abutting part and make a secure, sealed contact with the body metal of the part entirely around the bolt shank. Thereby the bolt head is self-calked and made fluid-tight. The annular ribs also enable an even contact to be obtained when the bolt is canted slightly in holes which are slightly out of register. The ribs will penetrate the abutting part or else upset to varying degrees around the shank to effect an even, continuous engagement with the part entirely around the shank. When the ribs penetrate the part they also assist in holding the latter and the bolt against relative transverse slippage. The bolt is shown as provided with several of the annular ribs but in some services a single rib may be sufficient. Except for the changes described the bolt 1ª is like the bolt 1.

What I claim is:

1. A separable fastener of the kind comprising a headed bolt and a nut therefor provided with coupling threads of the Dardelet self-locking type, characterized in that the height of the nut substantially corresponds to the length of the threaded portion of the bolt, the threaded bore of the nut opens into an enlarged non-threaded central recess in the base face of the nut, and the threaded portion of the bolt is joined to the bolt head by a non-threaded round shank portion of the bolt which is enlarged from said threaded portion substantially to the bolt head to an overall diameter which is intermediate the diameter of the nut recess and the over-all diameter of said threaded portion of the bolt by laterally deflectable and parallel bolt-hole-wall gripping ribs thereon which are of equal length and lie in helical paths of which the direction of winding about the bolt axis is reverse to that of the bolt thread, each of which ribs extends from the inner end of the threaded portion of the bolt substantially to the bolt head.

2. A separable fastener of the kind comprising a headed and threaded bolt and a threaded nut therefor, characterized in that the height of the nut substantially corresponds to the length of the threaded portion of the bolt, the threaded bore of the nut opens into an enlarged non-threaded central recess in the base face of the nut, and the threaded portion of the bolt is joined to the bolt head by a non-threaded round shank portion which is enlarged from said threaded portion substantially to the bolt head to an overall diameter which is intermediate the diameter of the nut recess and the over-all diameter of said threaded portion by parallel and laterally deflectable bolt-hole-wall gripping ribs thereon of equal length and substantially triangular cross section which meet base to base around the shank and lie in helical paths of which the direction of winding about the bolt axis is reverse to that of the bolt thread, each of which ribs extends from the inner end of the threaded portion of the bolt substantially to the bolt head and has one side face which is steeper and of less width from base to crest of the rib than its opposite side face and is turned toward the bolt head.

3. A two-part separable fastener of the kind consisting of a nut and a bolt of which the shank is provided with a head and has a threaded end portion on and off which the nut may be screwed, characterized in that the bolt shank has a non-threaded portion between its head and threaded end portion provided with a plurality of laterally deflectable bolt-hole-wall gripping ribs stepped therearound and each projecting farther from the shank axis than the shank thread and also lying in a helical path of which the direction of winding about the shank is reverse to that of the shank thread for lateral deflection of said ribs toward the bolt head, by forcible axial insertion of said ribbed non-threaded portion of the shank in a round bolt hole in one of the pieces to be fastened, into a friction gripping relation with the wall of said hole in which the friction grip of the shank ribs upon the wall of the hole will increase with the increase of the torque applied to the shank by the nut during subsequent screwing up of the nut upon the bolt to tightly clamp the fastened pieces between the shank head and the nut.

WILLIAM E. HOKE.